United States Patent [19]
Ghirardi et al.

[11] 3,711,633
[45] Jan. 16, 1973

[54] FITTING MEANS FOR AXIALLY SLIT CORRUGATED CONDUITS

[75] Inventors: Paul S. Ghirardi, Masury; Eugene V. McGowan, Warren, both of Ohio

[73] Assignee: General Motors Corporation, Detroit, Mich.

[22] Filed: Dec. 2, 1971

[21] Appl. No.: 204,275

[52] U.S. Cl..............174/135, 174/71 R, 174/72 A, 174/92, 285/156, 285/DIG. 4
[51] Int. Cl...............................................H02g 3/02
[58] Field of Search........174/40 CC, 71 R, 72 A, 92, 174/135, 138 R, 138 F, 156; 24/16 PB, 73 PF, 73 PB, 129 R, 255 C; 285/156, 373, 419, 423, DIG. 4

[56] References Cited

UNITED STATES PATENTS

| | | | |
|---|---|---|---|
| 3,151,905 | 10/1964 | Reuther et al. | 174/72 A UX |
| 3,183,302 | 5/1965 | Wochner et al. | 174/92 X |

FOREIGN PATENTS OR APPLICATIONS

| | | | |
|---|---|---|---|
| 1,224,522 | 2/1960 | France | 174/92 |

*Primary Examiner*—Laramie E. Askin
*Attorney*—W. E. Finken et al.

[57] ABSTRACT

In a preferred form, this disclosure relates to fitting means for use with a flexible, plastic, axially slit, corrugated tube for housing a plurality of electrical leads. The fitting means each include first and second portions which are adapted to be attached to the corrugated tube at axially spaced locations and which define therebetween a space or opening through which one or more wires from the tube via the slit can be passed. Each of the portions includes a pair of semi-circular sections which are integrally hinged along one side edge thereof and which can be moved from an open position to a closed position in which they surround the tube. The sections are latched together in a closed position by a releasable latching means and each of the sections has an arcuately and radially inwardly extending rib which is adapted to be received between adjacent ones of the corrugations of the corrugated tube whereby the fitting means is locked against movement axially of the corrugated tube and serves to locate the lead being removed therefrom at a predetermined location.

5 Claims, 9 Drawing Figures

INVENTORS
Paul S. Ghirardi &
Eugene V. McGowan
BY
W. A. Schuetz
ATTORNEY

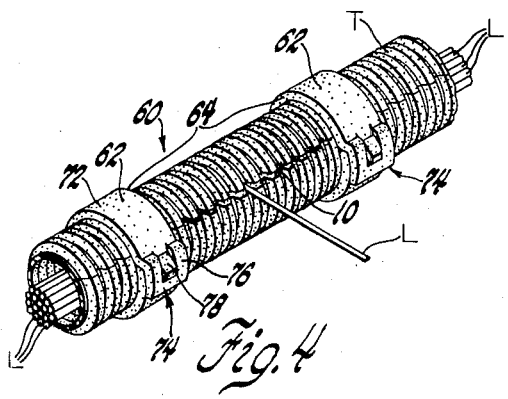
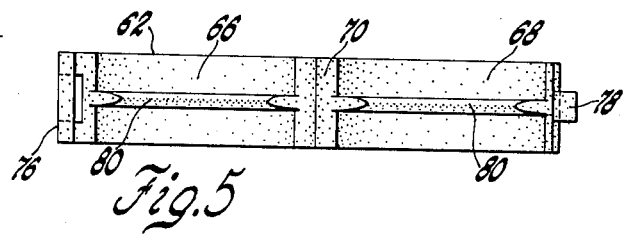
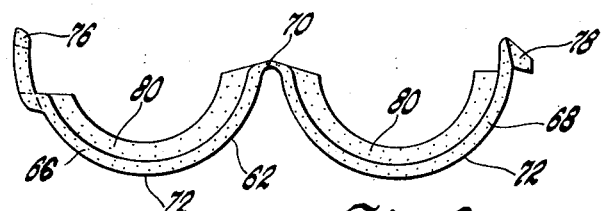
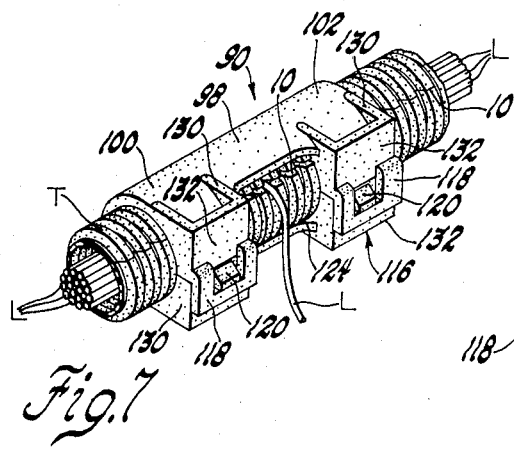
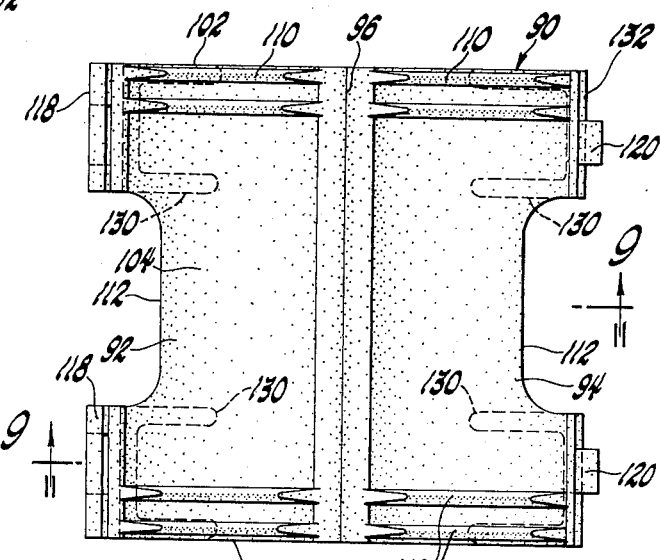
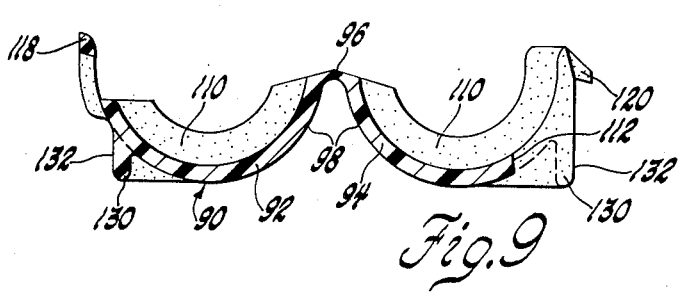

FITTING MEANS FOR AXIALLY SLIT CORRUGATED CONDUITS

The present invention relates to a fitting means, and in particular to a fitting means which is adapted to be attached to an axially slit, plastic, flexible corrugated tube housing a plurality of electrical leads to locate one or more leads removed from the corrugated tube via the slit at a predetermined location and prevent the same from moving axially along the slit in the tube.

In automobiles manufactured by the assignee of the present invention, the various electrical components of the vehicle are electrically connected with the battery via electrical leads or wires. Various ones of these leads are usually grouped together via tape wrapped therearound or housed in a housing to form what is commonly termed a wiring harness. One highly satisfactory type housing for housing the various electrical leads is a plastic, flexible, corrugated tube which is axially slit throughout its length. These corrugated tubes are highly versatile in that they can be readily bent and the axial slit enables a lead or leads to be removed therefrom at any location along their length. Another advantage of such corrugated tubing is that even though it is axially slit it will not come apart and thus, serves to house the various leads within the tube.

The present invention provides novel fitting means which are adapted to be attached to the corrugated tube to enable one or more leads to be removed therefrom via the slit and which serve to locate the lead or leads at a predetermined location and prevent the same from moving axially along the slit in the tube.

Accordingly, an important object of the present invention is to provide a new and improved fitting means for use with an axially slit, flexible, corrugated tube for housing a plurality of electrical leads, and in which the fitting means can be detachably connected to the corrugated tube at any location therealong so as to enable the lead or leads to be removed therefrom via the slit, the fitting means serving to locate the lead or leads at a predetermined location and prevent the same from moving axially along the slit in the tube.

Another object of the present invention is to provide a new and improved fitting means, as defined in the preceding object, and in which the fitting means is generally T-shaped and comprises a pair of generally semi-circular sections which are integrally hinged along the top side of the T and which can be moved from an open position in which the sections are disposed side by side to a closed position in which it surrounds a main corrugated tube or tubes and an auxillary tube extending transversely thereto, and in which the sections have a releasable latching means to latch the same in their closed position and the end portions of the T-shaped sections have circumferentially and radially inwardly extending ribs which are adapted to be received between adjacent corrugations of the tubes to hold the fitting in place on the main tube and to locate the auxillary tube at a predetermined location along the main tube.

Another object of the present invention is to provide a new and improved fitting means, as defined in the first object, and in which the fitting means is generally cylindrical in shape and comprises a pair of semi-circular sections which are integrally hinged along one side edge thereof and which can be moved from an open position in which they are disposed side by side to a closed position in which they surround the tube, and in which the sections have cut-outs which, when in their closed position, form an opening through which an electrical lead can be removed via the slit in the tubing and a releasable latching means for latching the sections in their closed position, and in which the sections at their opposite end portions have radially inwardly and circumferentially extending ribs which are adapted to be received between the corrugations of the tubing to hold the same in place on the tubing.

A still further object of the present invention is to provide a new and improved fitting means, as defined in the first object, and in which the fitting means comprises a pair of members which are adapted to be attached to the corrugated tube at axially spaced locations to define a space therebetween through which an electrical lead can be passed through the slit in the tubing, and in which the members comprise a pair of semi-circular sections which are integrally hinged along one side edge thereof and which can be moved from an open position in which they are disposed side by side to a closed position in which they surround the tube, and in which the members have releasable latching means for latching the sections in their closed position and have a radially inwardly and circumferentially extending rib which is adapted to be received between the corrugations to hold the members against relative axial movement with respect to the tubing.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 4 is a perspective view of a second embodiment fitting means of the present invention and showing the same attached to a corrugated tube;

FIG. 5 is a plan view of the fitting means shown in FIG. 4 and showing the same in its open position;

FIG. 6 is a side elevational view of the fitting means shown in FIG. 5;

FIG. 7 is a perspective view of a third embodiment of a fitting means of the present invention and showing the same attached to a corrugated tube;

FIG. 8 is a plan view of the fitting means shown in FIG. 7 and showing the same in its open position; and FIG. 9 is a cross-sectional view of the fitting means shown in FIG. 8 taken along the line 9—9 therein.

The present invention provides novel fitting means for use with a flexible, axially slit, plastic corrugated tube T housing a plurality of electrical leads L. The fitting means serve to locate a lead or leads L removed from the corrugated tube via the slit 10 at a predetermined location and prevents the lead or leads from moving axially along the slit 10 when removed therefrom.

The individual corrugations 11 of the corrugated tube T could be of any shape, as viewed in cross section, but preferably are generally trapezoidal in shape and the slit 10 preferably extends throughout the entire length of the tube T. It has been found that this type of tubing is highly versatile in that it can be bent and flexed in all directions and yet not cause any widening of the slit 10. The primary function of the slit 10 is to enable a lead or leads L to be removed at any location along the length of the corrugated tube 10.

Figure 1:
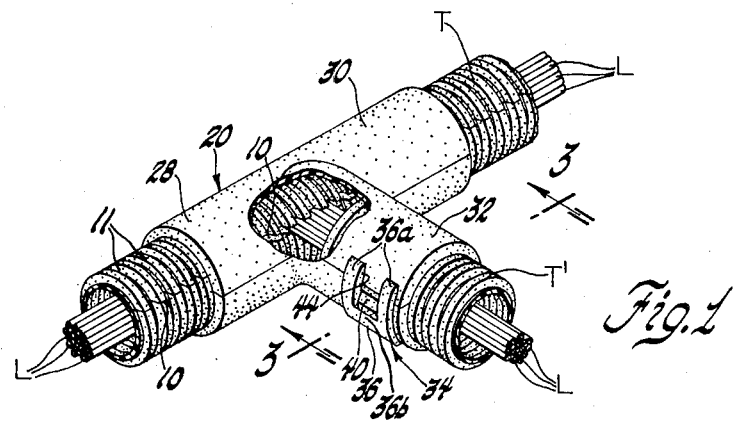
FIG. 1 is a fragmentary perspective view of one embodiment of the fitting means of the present invention and showing the same attached to axially slit corrugated tubes.
Figure 2:
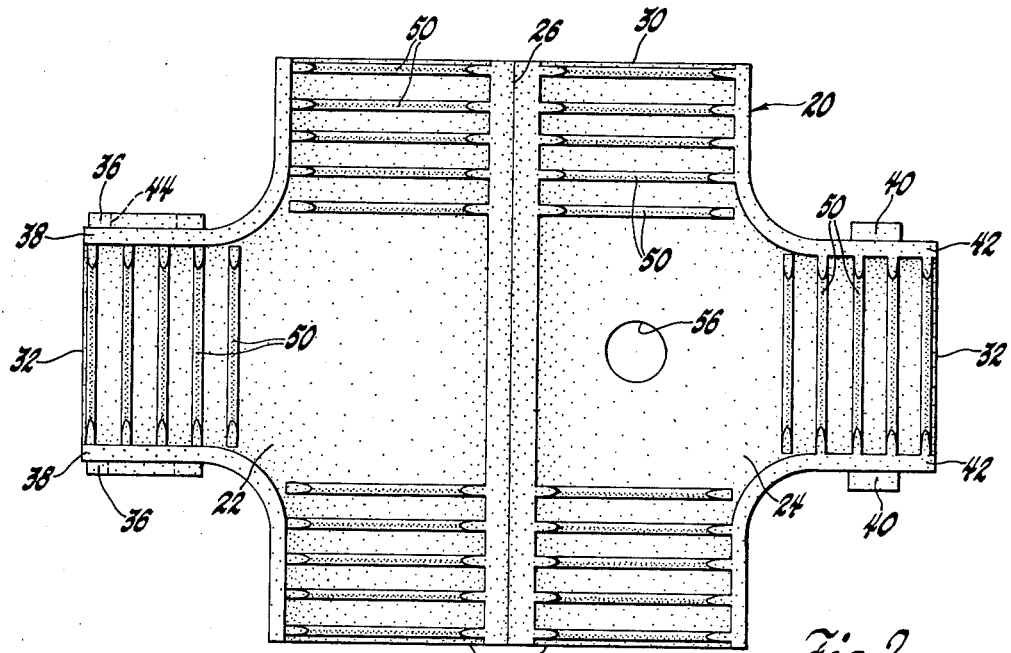
FIG. 2 is a plan view of the fitting means shown in FIG. 1 and showing the same in its open position.
Figure 3:
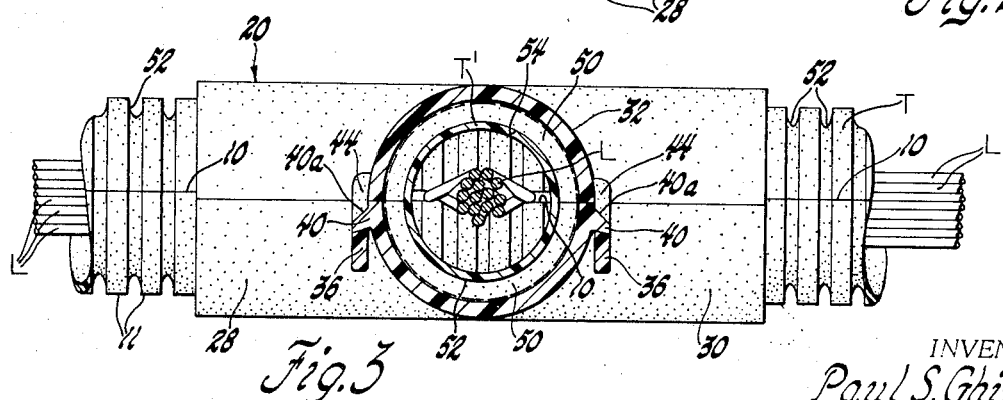
FIG. 3 is an enlarged cross-sectional view taken approximately along line 3—3 of FIG. 1.

FIGS. 1–3 show one embodiment of a fitting means 20 of the present invention. The fitting means 20 is generally T-shaped and is adapted to be attached to a main tube T or the adjacent ends of a pair of main tubes and to an auxiliary tube T¹ so that different wiring harnesses comprising a tube housing a plurality of leads can be interconnected.

The fitting means 20 comprises a pair of T-shaped sections 22 and 24 which are semi-circular, as viewed in cross section. The T-shaped sections 22 and 24 have a smooth exterior and are integrally hinged via a thin web or hinge 26 along their adjacent top side edges. The fitting means 20 is molded in its open position, as shown in FIG. 2 in which the T-shaped sections 22 and 24 are disposed side by side. The T-shaped sections 22 and 24 can be folded along their hinge 26 toward a closed position, as shown in FIG. 1, in which they surround the main tube T and the auxiliary tube T¹. When in their closed position the fitting means 20 is generally circular, as viewed in cross section. When the T-shaped sections 22 and 24 are moved to their closed position they define first and second spaced top end portions 28 and 30 which are adapted to surround the main tube T and a leg end portion 32 which is adapted to surround the auxiliary tube T¹.

The T-shaped sections 22 and 24 are adapted to be latched in a closed position by a releasable latching means 34. The releasable latching means 34 comprises a pair of catch members 36 integral with the opposite side walls 38 of the leg end portion 32 of the T-shaped section 22 and a pair of latch members 40 integral with the opposite side walls 42 of the leg end portion 32 of the T-shaped section 24, respectively. The latch members 40 are adapted to be snap fittingly received within the catch members 36.

The catch members 36 are U-shaped and extend tangentially of the side walls 38. The U-shaped latch members 36 have a pair of spaced legs 36a and a bridge 36b interconnecting the legs 36a at one end of the latter. The other ends of the legs 36a are integral with the side walls 38. The legs 36a and bridge 36b define an opening 44 for receiving the latch members 40. The latch members 40 are in the form of a rib or projection which extend radially outwardly from the side walls 42 of the leg portion 32 of the T-shaped section 24. The latch members 40 have tapered upper surfaces 40a.

When the T-shaped sections 22 and 24 are moved about their hinge 26 to their closed position, the bridges 36b of the catch members 36 engage the upper surfaces 40a of the latch members whereupon the catch members are caused to be deflected radially outwardly until the bridges 36b clear the latch members 40. When this occurs the latch members 40 are received within the opening 44 whereupon the catch members 36 will move radially inwardly toward their normal position, due to their inherent elastic characteristics, so as to lock the latch members 40 in the catch members 36.

Each of the T-shaped sections 22 and 24 adjacent its first and second top end portions 28 and 30 and its leg end portion 32 has a plurality of generally semi-circular, circumferentially and radially inwardly extending ribs 50. The ribs 50 are at axially spaced locations and are adapted to be received within recesses 52 between adjacent ones of the corrugations 11 of corrugated tubes T, T¹. The ribs 50 serve to lock the fitting 20 in place on the tubes T and T¹ and prevent relative axial movement therebetween. The leg portion 32 serves to provide an opening or space 54 through which a plurality of leads L can be removed from the main corrugated tube T and routed through the auxiliary tube T¹. The T-shaped section 24 also has a circular opening 56 intermediate its ends through which an individual lead or leads L from the main tube T can be passed via the slit 10 in the corrugated tube T.

The fitting means 20 serves as a breakout means to enable electrical leads or wires to be removed from the main corrugated tube T at a predetermined location and prevent the removed leads L from moving axially along the slit 10. The fitting means 20 also serves to limit the length of the gap which is created by removing one or more leads through the slit 10 so that other leads L in the tube T cannot accidentally pass through the slit 10.

FIGS. 4–6 show another embodiment of a fitting means 60 which can be used with an axially slit, plastic, flexible corrugated tube T to enable a lead or leads L to be removed at a predetermined location. The fitting means 60 comprises a pair of spaced members or portions 62 which are adapted to be attached to the corrugated tube T at spaced axial locations and which define therebetween a gap 64 to enable one or more leads L to be removed from the corrugated tube T.

Since both of the members 62 are of an identical construction, only the leftmost member 62 will be described in detail. The member 62 comprises a pair of semi-circular sections 66 and 68 which are integrally hinged via a flexible thin web or hinge 70 adjacent one side edge thereof. The sections 66 and 68 have a smooth outer semi-cylindrical surface 72 and are adapted to be molded in their open position in which the sections are disposed side by side, as viewed in FIGS. 5 and 6. The sections are adapted to be folded about their hinge 70 from their open position, as shown in FIG. 5, to their closed position, as shown in FIG. 4, in which they surround the corrugated tube T. The sections 66 and 68 are adapted to be latched together when in their closed position by a releasable latching means 74. The releasable latching means comprises a catch member 76 integral with the side of the section 66 opposite the hinge 70 and a latch member 78 integral with the side of the section 68 opposite the hinge 70. The releasable latching means 74 is of the same construction and functions the same as the releasable latching means 34 of the fitting means 20 previously described.

The sections 66 and 68 each include a generally semi-circular circumferentially and radially inwardly extending rib 80. The ribs 80 are adapted to be received between adjacent ones of the corrugations of the corrugated tube T when the sections are latched in their closed position and thus, serve to prevent relative axial movement between the member 62 and the corrugated tube T.

The pair of members 62 when latched to the corrugated tube T serve to locate a lead or leads L removed via the slit 10 in the corrugated tube T at a predetermined location and prevent the lead or leads from moving axially along the slit. They also limit the axial extent of the gap created by removing one of the leads L and thus, prevent accidental removal of other leads from the corrugated tube T.

FIGS. 7 through 9 show a third embodiment of a fitting means 90 which can be attached to an axially slit, flexible, corrugated plastic tube T to enable a lead or leads to be removed therefrom at any predetermined location. The fitting means 90 comprises a pair of generally semi-circular sections 92 and 94 which are integrally hinged via a flexible, thin web or hinge 96 adjacent one side edge thereof. The semi-circular sections 92 and 94 have generally cylindrical outer surfaces 98. The sections 92 and 94 each define first and second end portions 100 and 102 and an intermediate portion 104. The end portions 100 and 102 of each section 92 and 94 include a pair of axially spaced, generally semi-circular, circumferentially and radially inwardly extending ribs 110 which are adapted to be received between adjacent corrugations of the tube T when connected thereto and the intermediate portions 104 have a generally semi-oval cut-out 112.

The sections 92 and 94 are molded in their open position, in which they are disposed side by side, as shown in FIGS. 8 and 9, and are adapted to be folded about their hinge 96 to their closed position, as shown in FIG. 7, in which they surround the flexible corrugated tube T. The sections 92 and 94 are latched together in their closed position by a releasable latching means 116 which includes an integral catch member 118 at each of the end portions 100 and 102 of the section 92 and an integral latch member 120 at each of the end portions of the section 94. The latch and catch members 120 and 118 are of the same construction and function the same as that previously described in connection with the T-shaped fitting means 20 shown in FIG. 1.

When the sections 92 and 94 are latched in their closed position, the ribs 110 are received between adjacent ones of the corrugations to locate the fitting at a predetermined location on the corrugated tube T to prevent relative axial movement therebetween. When the fitting means 90 is in its closed position, the generally semi-oval cutouts 112 define a generally oval opening 124 through which one or more electrical leads L can be removed. The fitting means 90 serves to locate the removed leads L at a predetermined location and prevent movement of the leads L axially of the slit 10 as well as to limit the axial extent of the gap created when one or more leads are removed.

To aid in latching the latch and catch members 120 and 118 together, each of the sections 92 and 94 at their end portions are provided with a generally U-shaped reinforcing ribs 130. The ribs 130 are integral with the outer side wall 98 at the ends of the latter remote from the hinge 96. The ribs 130 have planar bottom surfaces 132 which are disposed tangentially of the fitting means 90 and the latch and catch members 120 and 118 are integral with the bottom surface 132. The U-shaped ribs 130 strengthen the end portions 100 and 102 and enable a person attaching the fitting means 90 to the corrugated tube T to press thereon to enable the latch and catch members 120 and 118 to be latched together. The U-shaped ribs 130 thus prevent bending or twisting of the sections 92 and 94 during the latching operation.

Although the illustrated embodiments hereof have been described in great detail, it should be apparent that certain modifications, changes, and adaptations may be made in the illustrated embodiments, and that it is intended to cover all such modifications, changes and adaptations which come within the spirit of the present invention.

What is claimed is:

1. A plastic fitting means for use with a flexible, axially slit, corrugated tube for housing a plurality of electrical leads comprising:
   first and second portions which are adapted to be attached to the corrugated tube at axially spaced locations and which define therebetween a space through which one or more wires from the tube via the slit can be passed,
   each of said portions comprising a pair of semicircular sections which are integrally hinged along one side edge thereof and which can be moved about the hinge from an open position in which the sections are disposed side by side to a closed position in which they surround said tube,
   releasable latching means for latching said sections in their closed position, said releasable latching means including a catch member on one of said sections and a latch member on the other of said sections which is adapted to be snap fittingly received in said catch member, said sections of each of said portions having an arcuately and radially inwardly extending rib which is adapted to be received between adjacent ones of the corrugations of said corrugated tube, said ribs being for locking said fitting means against axial movement relative to said corrugated tube, said fitting means being for locating a lead removed from said tube at a predetermined location therealong and preventing the lead from moving axially along the slit in said tube.

2. A fitting means for use with a flexible, axially slit, elongated corrugated tube for housing a plurality of electrical leads comprising: a one piece, plastic member having a pair of semi-circular sections which are integrally hinged along one side edge thereof and which can be moved about their hinge from an open position in which they are disposed side by side to a closed position in which they surround the tube, said sections when in their closed position defining first and second end portions which are adapted to be attached to the corrugated tube at axially spaced locations, said sections intermediate their first and second end portions defining an intermediate portion having an opening through which a lead from the tube via the axial slit can be passed, releasable latching means for latching said sections in their closed position, said releasable latching means comprising a catch member on one of said sections and a latch member on the other of said sections which is adapted to be snap fittingly received in said catch member, each of said sections adjacent said end portions having an arcuately and radially inwardly extending rib which is adapted to be received between adjacent ones of the corrugations of said tube, said ribs being for locking said fitting means against axial movement relative to said corrugated tube whereby said fitting means is adapted to locate a lead which is removed from said tube at a predetermined location and to prevent the lead from moving axially along the slit in the tube.

3. A fitting means for use with a flexible, axially slit, elongated corrugated tube for housing a plurality of electrical leads comprising: a one piece, plastic member having a pair of semi-circular sections which are integrally hinged along one side edge thereof and which can be moved about their hinge from an open position in which they are disposed side by side to a closed position in which they surround the tube, said sections when in their closed position defining first and second end portions which are adapted to be attached to the corrugated tube at axially spaced locations, said sections intermediate their first and second end portions defining an intermediate portion having an opening through which a lead from the tube via the axial slit can be passed, releasable latching means for latching said sections in their closed position, said releasable latching means comprising a catch member on one of said sections and a latch member on the other of said sections which is adapted to be snap fittingly received in said catch member, strengthening ribs integral with said end portions on their exterior sides to aid in enabling said latch member to be snap fittingly received in said catch member when said sections are manually moved toward their closed position, each of said sections adjacent said end portions having an arcuately and radially inwardly extending rib which is adapted to be received between adjacent ones of the corrugations of said tube, said ribs being for locking said fitting means against axial movement relative to said corrugated tube whereby said fitting means is adapted to locate a lead which is removed from said tube at a predetermined location and to prevent the lead from moving axially along the slit in the tube.

4. A plastic fitting means for use with a flexible, elongated, axially slit corrugated tube for housing a plurality of electrical leads comprising: first and second members which are adapted to be attached to the corrugated tube at axially spaced locations and which define therebetween a space through which a lead from the tube via the slit can be passed, each of said members comprising a pair of semicircular sections which are integrally hinged along one side edge thereof and which can be moved from an open position in which they are disposed side by side toward a closed position in which they surround said tube, releasable latching means for latching said sections in their closed position, said releasable latching means including a catch on one of the sections and a latch on the other of the sections which is adapted to be snap fittingly received in the catch, each of said sections of each of said first and second members having an arcuately and radially inwardly extending rib which is adapted to be received between adjacent ones of the corrugations of said tube, said ribs being for locking said members against axial movement relative to the corrugated tube and said members being adapted to locate a lead removed from the corrugated tube at a predetermined location and to prevent the same from moving axially along the slit in the tube.

5. A T-shaped fitting means for use with a flexible, axially slit, elongated corrugated tube for housing a plurality of electrical leads comprising: a one-piece, plastic member having a pair of T-shaped sections which are integrally hinged along their top side edge and which can be moved about their hinge from an open position in which they are disposed side by side to a closed position in which they surround a main tube extending along the top and a transversely extending auxiliary tube extending along the leg of the T-shaped fitting means, said sections when in their closed position defining first and second spaced top end portions which are adapted to be attached to the main tube at axially spaced locations and an intermediate leg end portion which is attached to the auxiliary tube, said leg end portion defining an opening with the top portion through which leads from the main tube can be passed to the auxiliary corrugated tube via the axial slit in the main tube, releasable latching means for latching said sections in their closed position, said releasable latching means comprising a catch member on one of the sections and a latch member on the other of said sections which is adapted to be snap fittingly received in said catch member, each of said sections adjacent said top end portions and adjacent said leg end portion having arcuately and radially inwardly extending ribs which are adapted to be received between adjacent ones of the corrugations of said main and auxiliary tube, said ribs being for locking said fitting means against axial movement relative to said tubes and for locking said auxiliary corrugated tube in place relative to the main corrugated tube whereby said fitting means is adapted to locate leads which are removed from said tube at a predetermined location.

* * * * *